US012223488B2

(12) United States Patent
Beyers et al.

(10) Patent No.: US 12,223,488 B2
(45) Date of Patent: Feb. 11, 2025

(54) SYSTEMS AND METHODS FOR MANAGING AND UPDATING REGISTER CONTENT

(71) Applicant: Target Brands, Inc., Minneapolis, MN (US)

(72) Inventors: Clayton Beyers, Minneapolis, MN (US); Dan Chamberlain, Minneapolis, MN (US); Erin Hanson, Minneapolis, MN (US); Matthew Howard, Minneapolis, MN (US); Rilee Krier, Minneapolis, MN (US); Ryan Lambrecht, Minneapolis, MN (US); John Russ, Minneapolis, MN (US); Julie L Wegmiller, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/316,389

(22) Filed: May 10, 2021

(65) Prior Publication Data

US 2022/0358475 A1 Nov. 10, 2022

(51) Int. Cl.
*G06Q 20/20* (2012.01)
(52) U.S. Cl.
CPC .................. *G06Q 20/202* (2013.01)
(58) Field of Classification Search
CPC .... G06Q 30/0269; G06Q 20/18; G06Q 20/20; G06Q 20/202; G06F 16/9535; G06F 16/23; G06F 16/00; G06F 3/0482
See application file for complete search history.

(56) References Cited

U.S. PATENT DOCUMENTS

| 7,693,897 | B2 * | 4/2010 | Bugir ........................ G06F 8/00 707/707 |
| 7,895,082 | B2 * | 2/2011 | Veres ................. G06Q 30/0601 705/26.8 |
| 8,997,246 | B2 * | 3/2015 | Grinstein .............. G06F 21/629 726/4 |
| 9,619,016 | B2 | 4/2017 | Li et al. |
| 11,055,964 | B2 * | 7/2021 | Washington .......... A63F 13/837 |
| 11,785,123 | B2 * | 10/2023 | Coverstone ..... H04M 1/724092 455/557 |
| 11,868,672 | B1 * | 1/2024 | Dehkordi ................ G06F 3/011 |
| 2012/0109741 | A1 * | 5/2012 | Ballapragada ..... G06Q 30/0277 705/14.43 |
| 2014/0089858 | A1 | 3/2014 | Yu et al. |

(Continued)

FOREIGN PATENT DOCUMENTS

| EP | 1011248 B1 | 3/2015 | |
| GB | 2506575 A * | 4/2014 | ....... G06F 17/30867 |
| WO | 2014197298 A1 | 12/2014 | |

*Primary Examiner* — Florian M Zeender
*Assistant Examiner* — Milena Racic
(74) *Attorney, Agent, or Firm* — Merchant & Gould P.C.

(57) ABSTRACT

Methods and systems for managing register content is described. A register content management module receives an identity of the retail location register, identifies a geographic location associated with the retail location register, identifies a time for which the updated register content is requested, generates a new register content, and sends the new register content to the retail location register independently from sending an application update to the retail location register.

17 Claims, 9 Drawing Sheets

(56) References Cited

U.S. PATENT DOCUMENTS

| | | | |
|---|---|---|---|
| 2015/0019356 A1* | 1/2015 | Bagdonas | G06F 3/04845 |
| | | | 705/16 |
| 2015/0170210 A1* | 6/2015 | Rhee | G06Q 30/02 |
| | | | 705/14.64 |
| 2015/0287277 A1* | 10/2015 | Arnone | G07F 17/3262 |
| | | | 463/25 |
| 2017/0076560 A1* | 3/2017 | Dasilva | G06Q 10/06 |
| 2018/0150868 A1 | 5/2018 | Stone et al. | |
| 2024/0201830 A1* | 6/2024 | Yao | G06F 3/0485 |
| 2024/0320444 A1* | 9/2024 | Maschmeyer | G06F 40/40 |

\* cited by examiner

SYSTEMS AND METHODS FOR MANAGING AND UPDATING REGISTER CONTENT

TECHNICAL FIELD

The present disclosure relates generally to methods and systems for managing content displayable on a point of sale device.

BACKGROUND

Computing systems often display content, such as a background display images. The content, such as the background image is often changed. On traditional computing systems, such a change is straightforward; a user of that computing system can simply select a new image for use as background. However, in circumstances where security of such systems is more tightly controlled, a user who is operating the computing system may not have appropriate rights to access settings to change the displayed content, or may not have access to files stored on that computing system. Still further, some computing systems may have restrictions in terms of the content that is stored thereon.

In one particular context, a computing system may be implemented as a point of sale device, also referred to herein as a register. A point of sale device, or register, in this context is a device owned or controlled by a retailer, and can be operated by a retail employee (e.g., at a standard checkout station) or can be operated by a customer (e.g., in the case of a self-checkout system). In both instances, the user, whether a retail employee or customer, will not have access to change administrative settings of the point of sale device. Additionally, such point of sale devices are executed based on tightly-controlled computing images due to security concerns—where financial transaction information is captured, the retail organization must be particularly careful regarding any extraneous files or instructions that are present on such a system, since that may expose security risks.

As point of sale devices, or registers, which are presented to customers (e.g., self-checkout devices) increase in popularity, there is an opportunity to use such devices, and the display that is presented to the user, to provide additional information to that user, whether it be seasonal information, thematic information, etc. This could be accomplished by changing the background displayed on a particular register to convey information to customers. However, due to the security and controls requirements above, a change in a background on a register currently requires updating the entire system (e.g., in the form of a new system image). That is, when new display content is desired, a system update is pushed out to the register computing system that updates the deployed system image to be executed at that register computing system, which in turn may include a new displayable background image. This often requires a large amount of data transfer, and coincidently, a large amount of time. Furthermore, code development and deployment is required to change a background image, which can take a long time to both develop and deploy the new code to the destination register computing system.

For at least these reasons, improvements to managing display content updates are desired.

SUMMARY

In general, the disclosure relates to a system for providing new register content to at least one of a plurality of retail location registers, wherein the new register content is generated and sent independently from an application update for the retail location register.

In an aspect, a register content management system for generating and sending updated register content is described. The system comprises a register content host computing system hosting a content application programming interface (API) exposed to a plurality of registers associated with a retail location. The content API is configured to receive information identifying a retail location register from among the plurality of registers and send updated register content to the retail location register. A register content management module executed on the register content host computing system is configured to, when executed by a programmable circuit of the register content computing system, complete the following: receive an identity of the retail location register, identify a geographic location associated with the retail location register, identify a time for which the updated register content is requested, generate a new register content, and send the new register content to the retail location register. Generating the new register content is based at least in part on the identity of the retail location register, the geographic location associated with the retail location register, and the time for which the updated register content is requested. Sending the new register content to the retail location register includes sending new register content that includes at least one of a background image, a background text, a background video, a background gif, an audible content, an image, a video, a text, a banner, and a screensaver. The new register content is generated and sent independently from sending an application update to the retail location register.

In another aspect, a method of providing updated register content to at least one of a plurality of retail location registers is described. An identity of at least one retail location register is received. A geographic location associated with the at least one retail location register is identified. A time for which the updated register content is requested is identified. A new register content is generated based at least in part on the identity of the at least one retail location register, the geographic location associated with the at least one retail location register, and the time for which the updated register content is requested. The new register content is sent to the at least one retail location register, which includes at least one of a background image, a background text, a background video, a background gif, an audible content, an image, a video, a text, a banner, and a screensaver. Generating and sending the new register content occurs independently from sending an application update to the at least one retail location register.

In yet another aspect, a retail location register is described. The retail location register includes a computing system comprising at least one processor communicatively connected to a memory. The memory storing computer-executable instructions comprising a software tool which, when executed, causes the system to do the following. Updated register content is requested via an application programming interface (API). The request includes an identity of the retail location register, a geographic location associated with the retail location register, and a time for which the updated register content is requested. New register content is received from a register content management system. The new register content is based at least in part on the identity of the retail location register, the geographic location associated with the retail location register, and the time for which the updated register content is requested. The new register content is displayed on a user interface of the retail location register. The new register content includes at least one of a background image, a background text, a background video, a background gif, an audible content, an image, a video, a text, a banner, and a screensaver. Receiving the new register content occurs independently from receiving an application update for the retail location register.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
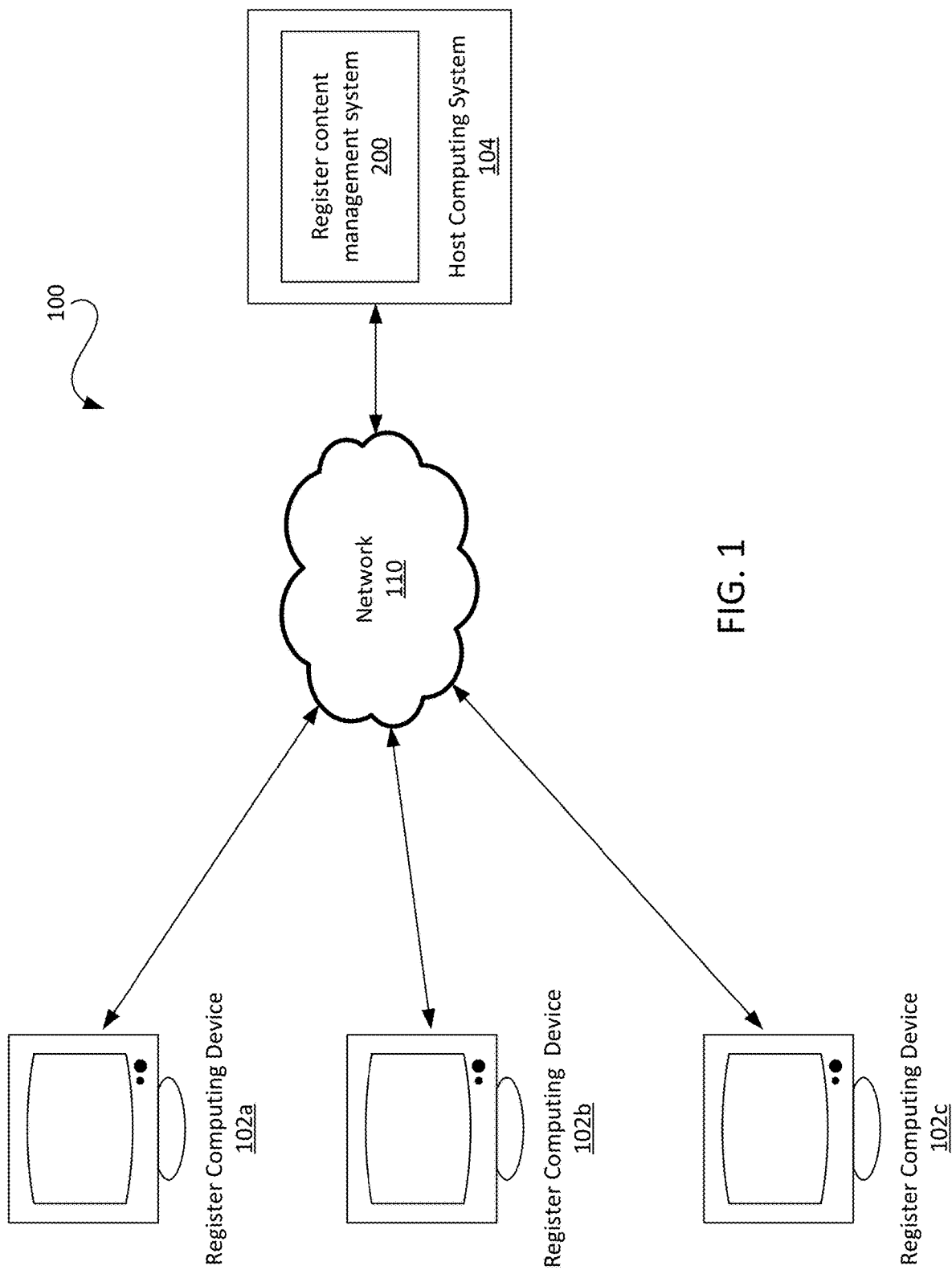
FIG. 1 illustrates a schematic diagram of an environment including register computing devices and a register content management system on a host computing system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

In general, the subject matter of this disclosure is directed to managing register content. More specifically, the disclosure relates to a system for updating displayable content on a register, where updating the displayable content, such as the background image data or other complementary image or video data, occurs independently from other updates provided to the register. Other types of content include screen savers, videos and other media, text, images, and banners. For simplicity, throughout this application register content is commonly referred to as background images and text, since this information is "background" or secondary, to the functionality of the register itself. In some instances, the image data may be positioned in a background area of a register display; however, this is not to be seen as limiting. The systems and methods herein may be used to update various types of register content as defined above.

The systems and methods described herein refer to updating and sending new register content, such as background text and images on a user interface of a register associated with a retail location. The retail location may further be associated with an enterprise system. The registers described throughout refer to, for example, a self-checkout register, a mobile point-of-sale computing device, or other device dedicated to use as a point-of-sale system, and having secure transaction processing software included therein. However, other types of registers are contemplated. Registers are referred to herein as register computing devices, retail location registers, or point-of-sale devices.

Register content, as defined herein, refers to any type of background content displayed on a user interface of the register. The register content may include at least attribute selected from a background image, a background text, a background video, a background gif, and an audible content. In further embodiment, the register content can include a plurality of attributes, such as both a background image and background text. Further, the register content may include displaying different attributes at different times during the checkout process. In yet a further embodiment, register content refers to a screen saver, a video or other types of media, text and images, or banners.

The currently described system and method deploys new and updated register content to a register computing device much faster than traditional systems. Traditional systems allow register computing devices to interact with a trusted server (e.g., either a server local to the register computing devices at a retail location or remote from such devices) to obtain "trusted" execution images, which ensures proper operation of the register computing systems. While this ensures proper operation of register computing devices, it also requires an entire application update in order to change the content on a register, for example by updating an entire application package (or an entire system image) to be deployed to the register, due to security, reliability, and consistency issues across register devices at a particular location. Application updates require a large amount of data transfer, and also require an extended period of time to transfer and update the register. Further, an application update requires generating new code by a developer. The register content management system described herein is implemented at register computing systems that are limited in access to such "trusted" local and remote servers, but the system described herein does not require an entire new code package to be developed, nor does it require an entire application update to update register content. The register content management system is faster and more efficient than the traditional system and methods.

The register content management system and method of use separates updating or changing background image data with updating or changing an entire application. Utilizing the register content management system and method allows register content to be changed without requiring an overall application update. Updating only the desired content, such as the background image data, requires much less data transfer and is faster than pushing an entire application update.

The register content management system eliminates the need for code deployment to change the user interface of the retail location register to reflect various guest facing elements. Advantageously, the described system and method eliminates engineering hours spent on content changes.

The register content management system also enables point-of-sale devices to update content while only being connected to a local secure network. The register content management system is useful for point-of-sale devices that cannot use third party services, or may not have access to a public network, such as the Internet, to update content. In other words, since point-of-sale devices must be securely managed, an internal application that runs within a secure segment of an enterprise's network is needed to update register content when required.

The retail location registers can be updated based on being located in a particular retail location or even based on an identification of the particular retail location register itself. For example, retail location registers associated with a retail location may be updated based on their geographical location, such as being located in a particular city. Further, the retail location register may be updated based on the individual retail location register, such as having register content based on being a self-checkout register versus a point-of-sale device used by employees.

The register content can be deployed via an application programming interface (API). In example implementations, the retail location registers store a default set of register content, such as a default background image with default text. To update the register content at a predetermined interval, each retail location register issues an API call at the particular interval to a register content management system. The server hosting the content (the register content management system) may implement a schedule at which the content is released to the retail location registers, thereby managing the schedule at the server side.

The register content management system can be hosted, at least in part, on a network local to the retail location, such as a local data center. Hosting locally allows for faster data transfer between the data center and the point-of-sale devices, and may be desirable for delivery of register content of significant size, due to the number of registers that would otherwise require content delivery if managed from a single remote server to all enterprise register computing devices.

In an alternative embodiment, a register content management system can push out new register content on a predetermined schedule for each register computing device, with certain devices being scheduled at common or staggered times to ensure coordination of content updates across devices at a given location while managing overall bandwidth requirements for a host of the register content.

FIG. 1 illustrates an example computing environment 100 for implementing the register content management system 200 as described in more detail herein. The computing environment 100 includes a host computing system 104 hosting the register content management system 200, a first register computing device 102a, a second register computing device 102b, and a third register computing device 102c, connected by a network 110. In alternative embodiments any number of register computing devices 102 may be connected, for example every register computing devices of a retail location, and every register devices of an enterprise system.

The register computing device 102 may be a self-checkout register device or a point-of-sale device used by employees of the retail location to complete a checkout process (also referred to as a retail location register). However, other types of register devices are contemplated. As described below in more detail, each register computing device 102 has a unique identification number. The identification number is usable for identifying the unique register computing device that is requesting an update content or new content.

In the examples described herein, the register computing device 102 is associated with a retail location, which may be associated with an enterprise system.

The example network 110 is a computing device network that may include a private network, or may be implemented using only trusted portion(s) of a public network, such as the Internet. In some arrangements, the network 110 includes wired and/or wireless networks. As noted, in this example, the register computing device 102 communicates with the host computing system 104 using the network 110.

Figure 2:
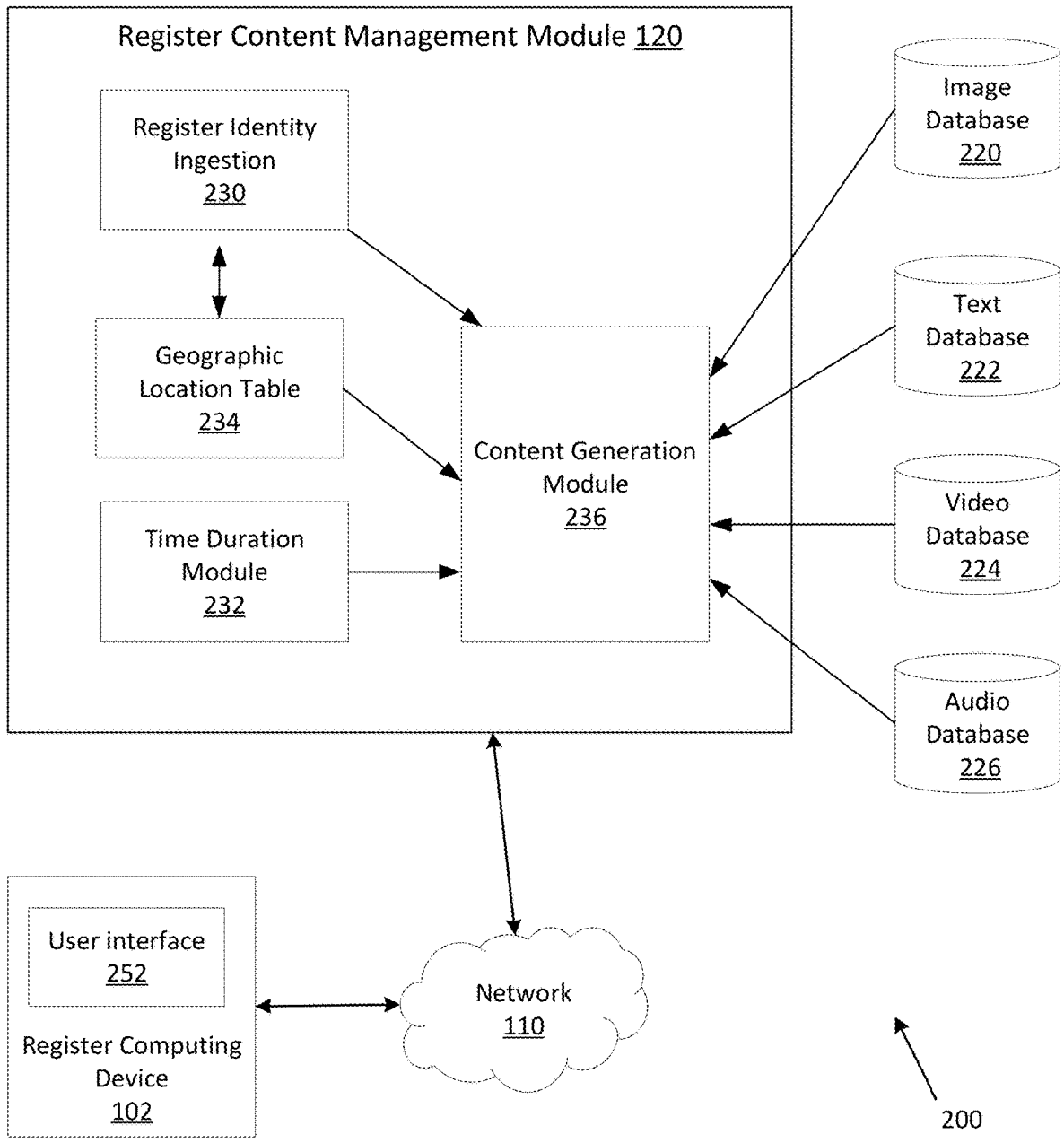
FIG. 2 illustrates a detailed block diagram of the register content management system of FIG. 1.

FIG. 2 illustrates an example block diagram of a register content management system 200 including a register content management module 120 connected to a register computer device 102 via the network 110.

The register computing device 102 includes a user interface 252, which displays the register content. The user interface 252 is also configured to receive user inputs as needed. For example, if the register computing device 102 is a self-checkout register, the user interface 252 may receive inputs such as when a user selects to start a checkout process. Further, receiving inputs from a user on the user interface 252 may trigger the register content to change. For example, after a payment transaction is completed, the user interface 252 may display different register content. In another example, a screen saver may be on the user interface 252, and when a customer touches the screen to begin a transaction, the screen saver goes away.

Further, the register computing device 102 may output register content, such as audio through a means other than the user interface 252.

The register content management system 200 includes a register content management module 120 that is capable of communicating with a plurality of databases 220, 222, 224, 226, and at least one register computing device 102. The register content management system 200, including the register content management module 120 and the databases 220, 222, 224, 226 may be hosted on the host computing system 104.

The register content management module 120 includes, at least, a register identity ingestion module 230, a time duration module 232, a geographic location table 234, and a content generation module 236.

The register identity ingestion module 230 is capable of communicating with the content generation module 236 and the geographic location table 234. The geographic location table 234 is capable of communicating with the register identity ingestion module 230 and the content generation module 236. The time duration module 232 is capable of communicating with the content generation module 236. The functioning of each of these modules is described in more detail below.

The register identity ingestion module 230 is configured to receive an identity of at least one register computing device 102 that is requesting an updated or a new register content. The register identity is specific to the individual register computing device 102. In an embodiment, the register identity includes the type of register, the location within the retail location of the register, the geographic location of the register, and the currently displayed register content. Other pertinent information may also be included.

The geographic location table 234 contains information including at least a geographic location of the register computing device 102 associated with a retail location and, in some embodiments, an enterprise system. In an embodiment, the geographic location table 234 can be used to look up the geographic location of a register computing device 102 via the register identity received at the register identity ingestion module 230.

In a first example, the location may be a city, a county, or a state. However other locations are contemplated. Locations may be specific to an individual retail location or even department within the retail location.

The time duration module 232 is used to determine a time at which the new register content is to be displayed on the user interface of the register computing device 102. A time may include a start date and a stop date, or may include a time duration. In a further embodiment, the time may be relative to the checkout process itself, wherein the displayed content is different at the beginning of the checkout process than at the end of the checkout process.

Different predetermined time periods may be used, depending on the actual background image. In a first example, the background image of the basketball may only to be displayed while a basketball tournament is taking place. In an alternative example, the background image may be displayed for a period of time, such as one week. Other time periods are contemplated.

The content generation module 236 receives inputs from the register identity ingestion module 230, the geographical location table 234, and the time duration module 232 to generate new content, and ultimately send the new register content to the appropriate at least one register computing device 102. The content generation module 236 also communicates with at least one database to receive specific attributes of the register content based upon the desired register content.

The databases may include, but are not limited to, an image database 210, a text database 222, a video database 224, and an audio database 226.

The image database 210 may maintain a plurality of images that can be displayed on a user interface of the register computing device 102. Different background images can be created and stored at the image database 220 for future use. Different background images are useful to be personal to the register computing device 102 at which they are displayed. For example, a basketball image may be useful to display on devices located in stores in a city where the NCAA men's basketball tournament is taking place. In such an example, the background image may be displayed for a predetermined period of time, which is described in more detail below.

The text database 222 may include a plurality of texts that can be displayed on a user interface of the register computing device 102. For example, text may be a city name, or a location name. Text may also be specific to the time during the checkout process, such as "Welcome," and "Good Bye."

The video database 224 includes a plurality of videos that can be displayed on a user interface of the register computing device 102. The video database 224 may also include a plurality of gifs. Different videos and/or gifs are useful to be personal to the register computing device 102 at which they are displayed. For example, a video of a slam dunk may be useful to display on devices located in stores in a city where the NCAA men's basketball tournament is taking place. In such an example, the video or gif may be displayed for a predetermined period of time.

The audio database 226 includes a plurality of different audio clips that may be produced by the register computing device 102. For example, an audio clip may be an audio recording reciting the city name, or the location name. The audio may also be specific to the time during the checkout process, such as "Welcome," and "Good Bye."

As needed, an administrative user may update the database(s) to include greater or fewer images, texts, videos, gifs, and audio clip.

The register content management module 120 can be hosted at the host computing system 104. The register content management module 120 communicates via network 110 to the register computing device 102. The register computing device 102 displays on the user interface 252, received register content.

Figure 3:
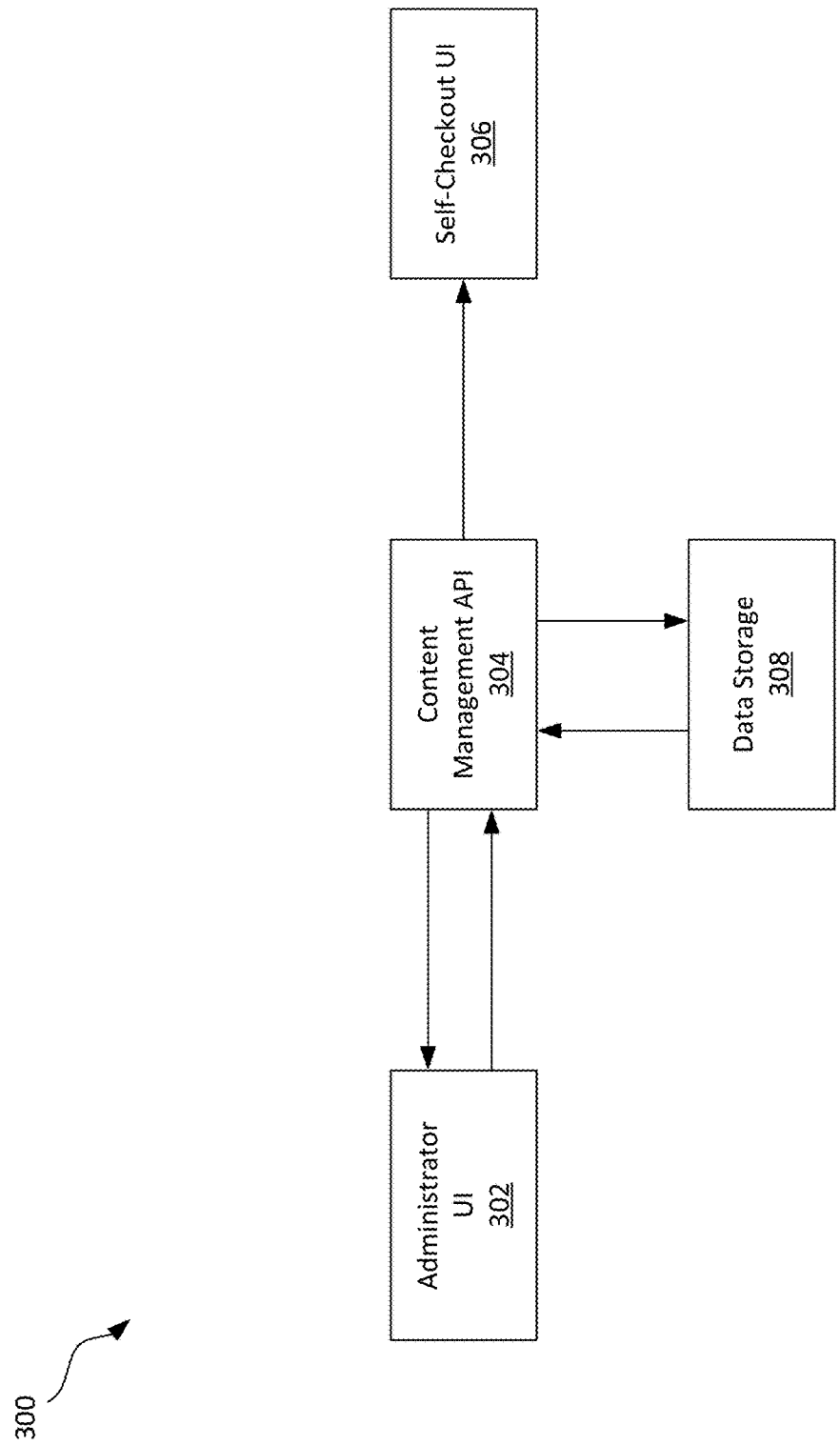
FIG. 3 illustrates a block diagram of an architecture of the register content management system.

FIG. 3 illustrates a block diagram of a system architecture 300 useful for implementing the register content management system. The system architecture 300 includes the administrator user interface 302, a content management API 304, a self-checkout user interface 306, and a data storage module 308. In another embodiment, a mobile point-of-sale user interface is also included. In yet another embodiment, additional data storage modules are also included.

The administrator user interface 302 is capable of communicating with the content management API 304. The administrator user interface 302 allows an administrative user to update register content as needed on a global scale, such as adding register content to the data storage module 308. Alternatively, the administrator user interface 302 allows an administrative user to access the register content associated with a single register computing device 102.

The content management API 304 is capable of communicating with the administrator user interface 302, the data storage module 308, and a self-checkout user interface 306. The content management API 304 is useful for receiving information from the register computing device 102, including, but not limited to, information identifying a retail location of the register computing device 102. In example embodiments, the content management API 304 is exposed to, and accessible by, only authenticated end entities, e.g., register computing devices. For example, a set of trusted register computing devices may be managed by the register identity ingestion module 230 or other data distribution management capability to ensure that register computing devices and any administrative devices trusted within an enterprise (and hosting an administrative user interface 302) are the only devices able to access content via the content managed via the system described herein.

The data storage module 308 stores data related to register content. For example data storage module 308 may store data useful for generating and sending updated register content. For example, data storage module 308 may communicate with databases storing images, texts, videos, gifs, and audio content.

The self-checkout user interface 306 receives register content from the content management API 304. In an example, when the self-checkout user interface 306 desires an updated register content, it sends a request via the content management API 304. The content management API 304 receives the new register content and pushes it to the self-checkout user interface 306.

Referring generally to FIG. 3, it is appreciated that while a computing system hosting the administrator user interface 302 may be able to communicate with other systems (e.g., to obtain content to be prepared for display on a register computing device), in some embodiments, the content management API 304 is not accessible directly by untrusted devices, and access to the data storage module 308 is managed via the content management API 304, for updating/consumption by the self-checkout user interface 306. Accordingly, other than via the administrator user interface 302 (for which user access is tightly controlled within an enterprise), public or untrusted access to systems described herein is generally limited and/or disallowed.

As described above, the system architecture 300 described herein is more efficient than previous register content update systems and method. When new register content is desired, the entire application does not need to be updated on the register computing device 102. Instead, only the register content needs to be updated. This results in a transfer of a smaller amount of data, which is capable of faster transfer, and conserving resources where needed. Further, since the register computing devices 102 can send an API request, and a response can be based on a particular register identifier, the register content can be updated on a per-register basis.

Figure 4:
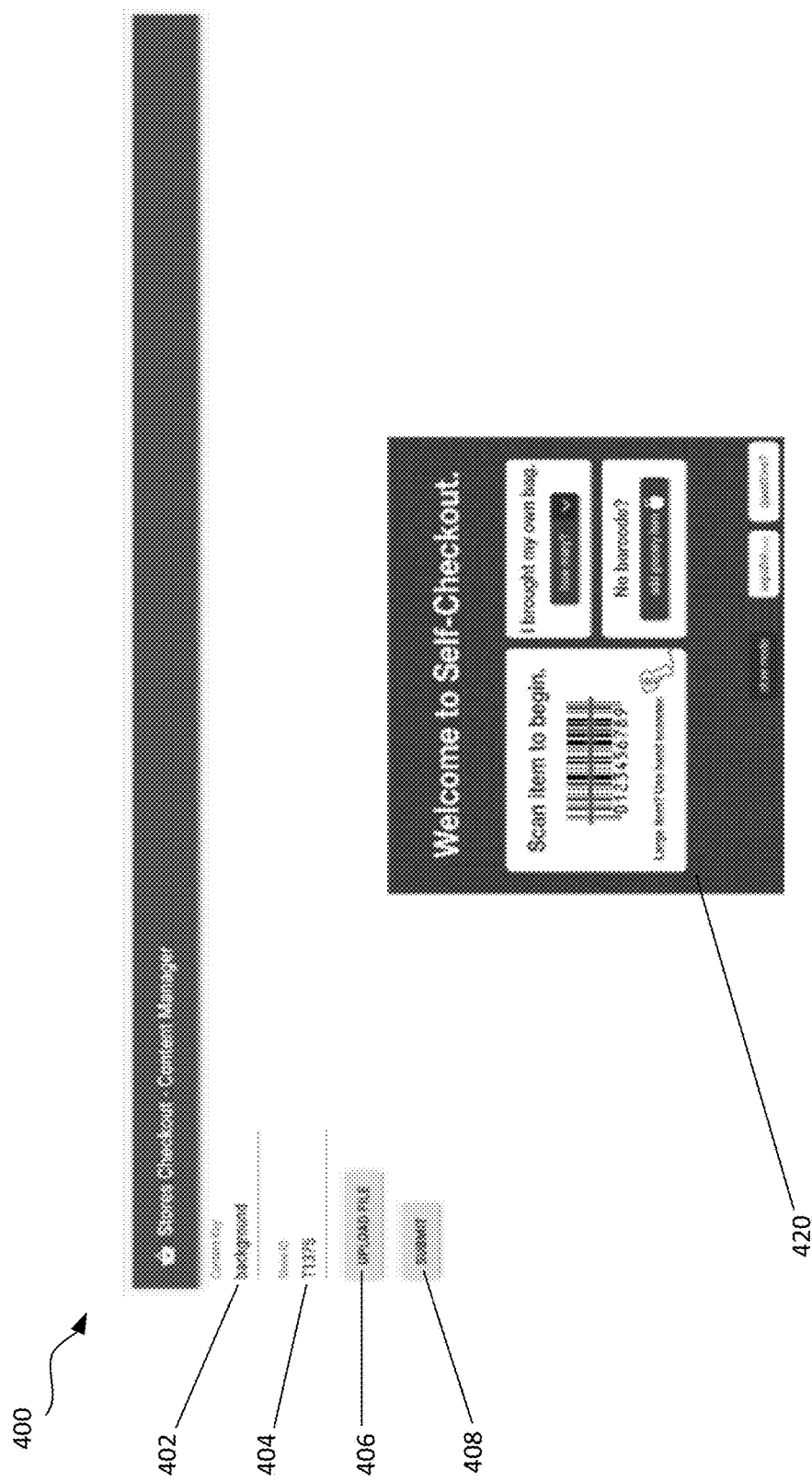
FIG. 4 illustrates an administrative user interface for managing register content.

FIG. 4 illustrates an example administrative user interface 400 for the register content management system described herein. The administrative user interface 400 includes a content key 402, a store ID 404, and upload file selectable button 406, a submit selectable button 408, and a register user interface preview 420.

The administrative user interface 400 is usable for the development of new register content and the previewing of the new register content. The new register content may include at least one of an image, text, video, gif, and audio, and also may any combination thereof.

The content key 402 is related to what type of new register content is currently being previewed. For example, in the administrative user interface 400 shown, the content key 402 is "background" and the register user interface preview 420 shows a background image. The content key 402 can also be used to select other types of new register content, such as text, video, gif, and audio. Still further, more than one type of content may be included in the new register content.

The store ID 404 indicates which specific retail location and/or the register computing device 102 that the updated register content is being developed for, or previewed on the administrative user interface 400.

The upload file selectable button 406 allows an administrative user to upload any one of a plurality of files us to be accessible by the register computing device 102. The files may be associated with the new register content including at least one of a background image file, the background text file, the background video file, a background gif file, and an audible content file. Still further, the files may include more than one of the images, texts, videos, gifs, and audio.

The submit selectable button 408 allows an administrative user to finalize and upload of any one of the plurality of files for new register content. In a first example, the new register content is uploaded to the host computing system 104, where it is stored until a request from the register computing device 102 is received. In another example, the new register content can be sent to the register computing device 102 by the administrative user.

The register user interface preview 420 displays a preview of the new register content that is being edited or previewed by an administrative user. As shown, the user interface preview 420 includes text and the background image. The user interface preview also includes the default portions of the user interface, such as the "scan items to begin" portion, the "I brought my own bag" portion, and the "no barcode" portion.

As can be seen in FIG. 4, the administrative user interface 400 allows an administrative user to upload or select content for display on one or more registers without the administrative user needing to perform code development or to otherwise re-create an application image for upload to a particular register. Rather, the administrative user need not have particular technical expertise in creating code packages for deployment to registers, but merely can select content for inclusion at a particular one or more registers. This provides further simplification of the content updating process.

Figure 5A:
FIGS. 5a-5c illustrate example user interfaces including register content.
Figure 5B:
Figure 5C:

FIGS. 5*a*-5*c* illustrate example user interfaces displayable on a retail location register that each include register content. As shown at FIG. 5A, a user interface 502 includes register content including the text "Welcome to Minneapolis" and a green background with footballs image. The user interface 502 may be displayed on a plurality of register computing devices 102 that are located in Minneapolis retail locations during a football game.

In an embodiment, such a register content may be sent to the register location device with instructions to display the register content for 12 hours every Sunday while a football game is being played. After the 12 hour period is over, the register computing device 102 may display a default register content on the user interface.

FIG. 5*b* illustrates another user interface 504 including register content that may be displayed on a register computing device 102. The user interface 504 displays a background image of a basketball and the text "Shop, Scan, Slam!" Such a user interface 504 may be displayed at locations in a city where a basketball tournament is taking place. In an embodiment, such a register content may be sent to the register location device with instructions to display the register content for a two-week period while the basketball tournament is being played.

FIG. 5*c* illustrates another user interface 506 that may be displayed on a retail location register. The user interface 506 displays a background image that is pink with line drawings of different inventory items a user may find at the retail location. The user interface 506 includes the text "Stamford" which may be displayed on retail location registers that are located in the city of Stamford.

Although not shown, any of the example user interfaces 502, 504, 506 may additionally or alternatively include videos and/or audio.

Figure 6:
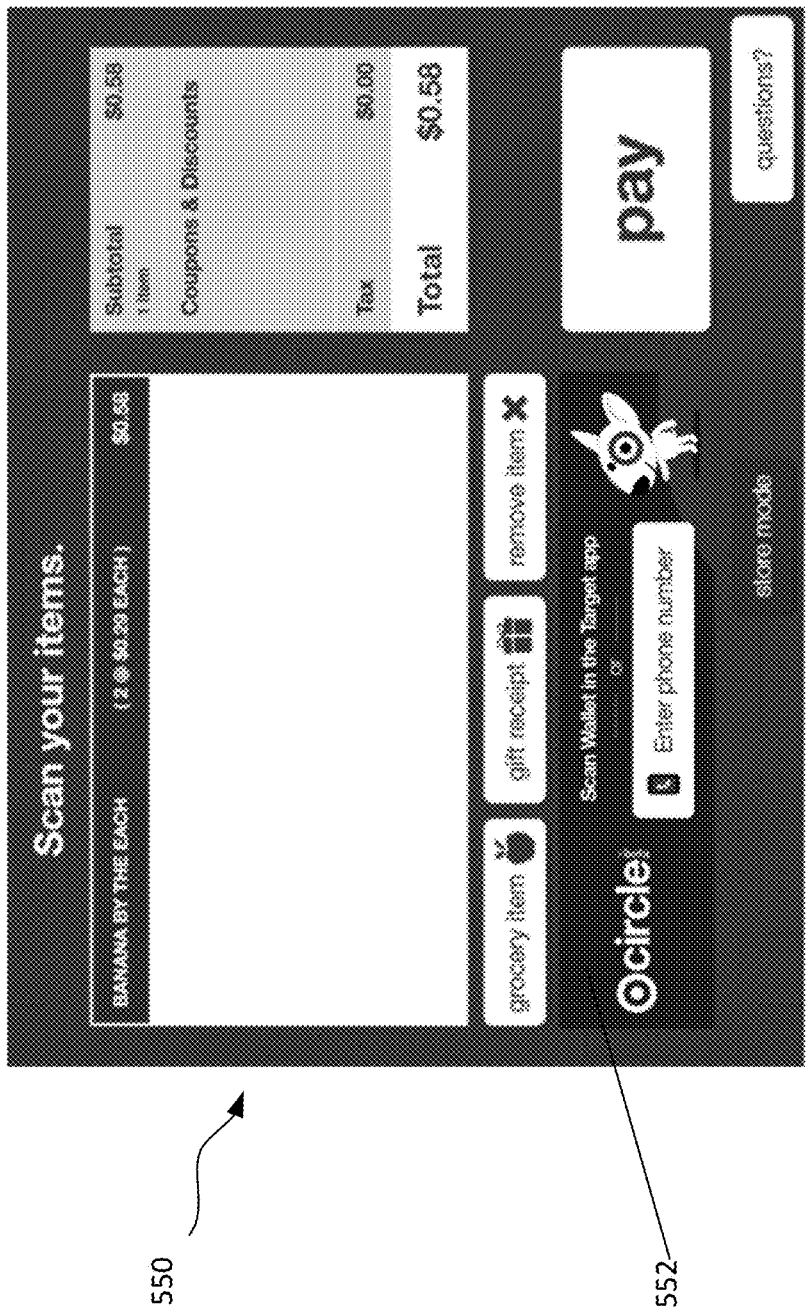
FIG. 6 illustrates an example user interfaces including banner content.

FIG. 6 shows an example user interface 550 including a banner 552 having changeable content. The banner 552 includes text and images that are generic to the retail location, but is changeable based on a variety of factors. For example, the banner may change based on the location of the retail location, the time of day, or in response to what a user has scanned to purchase. The rest of the user interface 550 may remain unchanged. While the user interfaces of FIGS. 5*a*-5*c* illustrate editable background, or wallpaper, images, FIG. 6 illustrates a changeable banner that is presented as a foreground image and may be changeable. However, this banner may still be considered "background" in that it is not part of the active functionality of the register used for conducting a sales transaction.

Figure 7B:
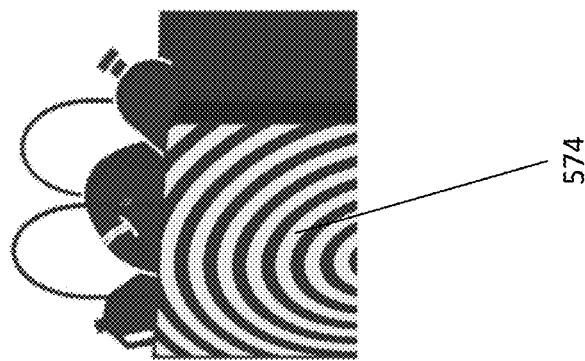
FIGS. 7A-B illustrate a user interface of two still images of a screensaver.
Figure 7A:
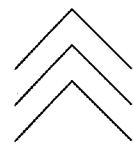
Figure 7A:
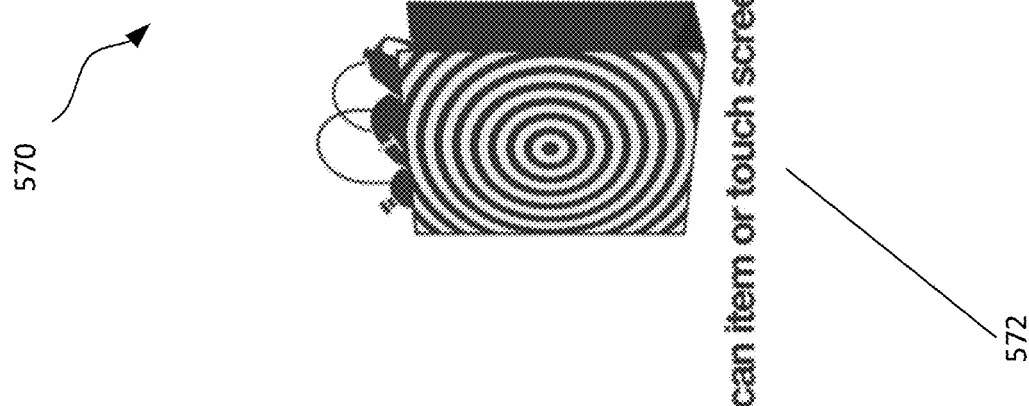

FIG. 7, which includes FIGS. 7A and 7B, illustrates a user interface 570 of two still images of a screensaver 572, 574. FIG. 7A illustrates an example still image of screensaver 572 and FIG. 7B illustrates an example still image of screensaver 574. The screensaver 572, 574 is another example of register content. In an example, the screensaver 572, 574 is displayed when the register is not in active use. The screensaver 572, 574 includes the text "scan item or touch screen to begin," which provides instructions to a user for use. When a user touches the screen, the screensaver 572, 574 ends and a different user interface is shown (e.g., one of the user interfaces of FIGS. 5*a*-5*c* or FIG. 6).

Figure 8:
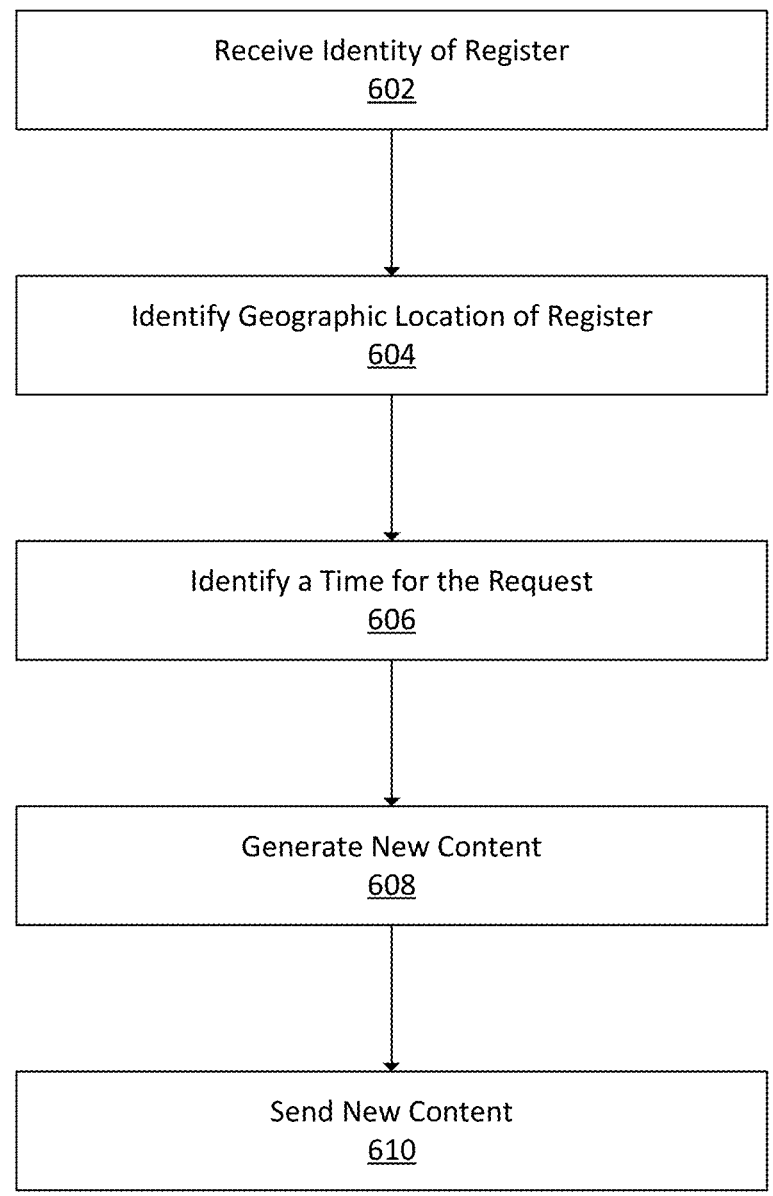
FIG. 8 illustrates a block diagram of a method of generating and sending new register content.

FIG. 8 shows a block diagram of an example method 600 of generating and sending new register content to at least one register computing device 102 associated with a retail location.

At step 602, an identity of the register computing device requesting updated register content is received. Each register computing device may be associated with a unique identification number which allows the register content management system to determine a variety of details regarding the register computing device. For example, some details may be what type of register is requesting the updated content, such as whether the register is a self-checkout register or a mobile point-of-sale device. Identification may also be used to determine where the retail location register is located, which is useful for determining the geographic location of the register. The identification of a particular register may include identification of the register based on a register identifier, a registered type (e.g., a point of sale or self-checkout device), a register location, or other identifying characteristic.

At step 604, the geographic location of the register is identified. This identification may be received directly from the register computing device, or may be determined by use of the received identity of the register computing device.

At step 606, a time for which the updated register content is requested to be displayed is identified. The time may be a period of time or may include a start date and a stop date. For example, a start date may be the first day of a locally hosted sports tournament, and the end date may be the last day of the sports tournament. Alternatively, register content may be displayed for a total time of one week, regardless of this calendar date. Still further, register content may be dependent on the time of day, for example, morning, afternoon, or night.

At step 608, the new register content is generated. The new register content is based at least in part on the identity of the register, the geographic location associated with the retail location register, and the time for which the updated register content is requested.

The new register content includes at least one of a background image, a background text, a background video, a background gif, and an audible content. In an example, the new register content includes both text and an image.

The new register content may also include instructions for display of the new register content. The instructions for display may include details such as when to display the new register content during the checkout process on a user interface associated with the retail location register. The instructions may direct the register computing device to display a first register content at the beginning of the checkout process and a second register content at the end of the checkout process.

The instructions may also include the time period for which the new register content is to be displayed. The time period may be a time duration, or may include a start date and an end date.

At step 610, the new register content is sent to the at least one register computing device 102. As discussed, the new register content includes at least one of a background image, a background text, a background video, a background gif, and an audible content. In an embodiment, the new register content may also be associated with the set of instruction as to when to display certain portions of the new register content.

The new register content is generated and sent independently from sending an application update to the retail location register. This allows for more efficient and quicker generation and transfer of the new register content. Unlike register computing devices that require an entire application update to change user interface backgrounds, the present method 600 only requires the transfer of the data relating to the new register content.

Figure 9:
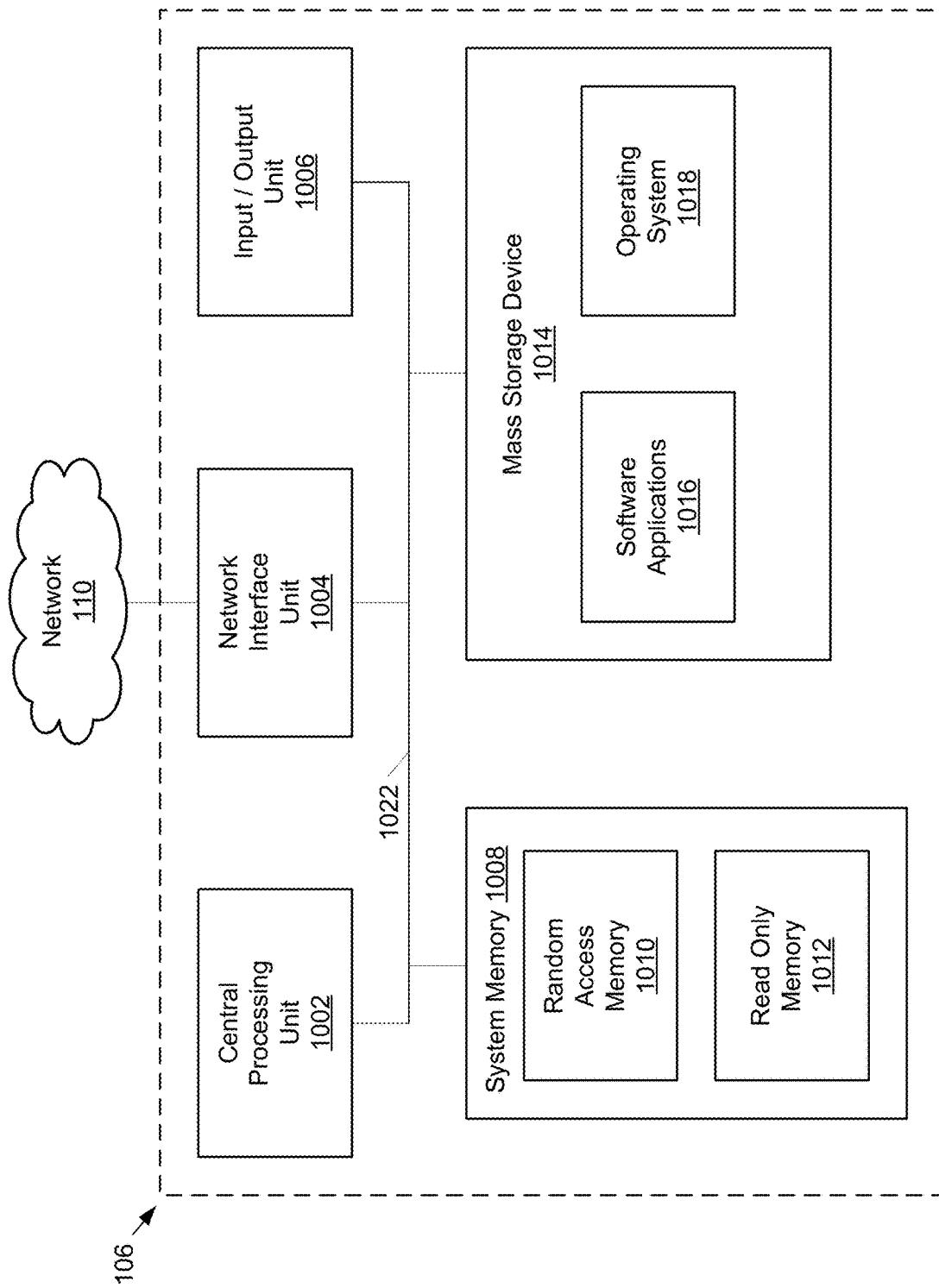
FIG. 9 displays a schematic diagram of an example computing device usable in the system of FIG. 1.

As illustrated in FIG. 9, example physical components of the host computing system 104 are shown. Other computing devices (e.g., the register computing device 102) can be configured in a similar manner.

The host computing system 104 includes at least one central processing unit ("CPU") 1002, also referred to as a processor, a system memory 1008, and a system bus 1022 that couples the system memory 1008 to the CPU 1002. The system memory 1008 includes a random access memory ("RAM") 1010 and a read-only memory ("ROM") 1012. A basic input/output system that contains the basic routines that help to transfer information between elements within the host computing system 104, such as during startup, is stored in the ROM 1012. The host computing system 104 further includes a mass storage device 1014. The mass storage device 1014 is able to store software instructions and data.

The mass storage device 1014 is connected to the CPU 1002 through a mass storage controller (not shown) connected to the system bus 1022. The mass storage device 1014 and its associated computing device-readable data storage media provide non-volatile, non-transitory storage for the host computing system 104. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program applications or other data. Example types of computer-readable data storage media include, but are not limited to, random access memory ("RAM"), read-only memory ("ROM"), erasable programmable read-only memory ("EPROM"), electrically erasable programmable read-only memory ("EEPROM"), flash memory or other solid state memory technology, compact disc read-only memory ("CD-ROMs"), digital versatile discs ("DVDs"), other optical storage media, magnetic cassettes, magnetic tape, magnetic disk storage or other magnetic storage devices, or any other medium which can be used to store the desired information and which can be accessed by the host computing system 104.

According to various embodiments, the host computing system 104 may operate in a networked environment using logical connections to remote network devices through the network 110, such as the Internet, or another type of network. The host computing system 104 may connect to the network 110 through a network interface unit 1004 connected to the system bus 1022. It should be appreciated that the network interface unit 1004 may also be utilized to connect to other types of networks and remote computing systems. The host computing system 104 also includes an input/output controller 1006 for receiving and processing input from a number of other devices, including a touch user interface display screen, or another type of input device.

Similarly, the input/output controller 1006 may provide output to a touch user interface display screen or other type of output device.

As mentioned briefly above, the mass storage device 1014 and the RAM 1010 of the host computing system 104 can store software instructions and data. The software instructions include an operating system 1018 suitable for controlling the operation of the host computing system 104. The mass storage device 1014 and/or the RAM 1010 also store software instructions and software applications 1016, that when executed by the CPU 1002, cause the host computing system 104 to provide the functionality discussed in this document.

As described throughout, the system and methods relate to improvements in generating and sending new register content. The new register content may include at least attribute selected from a background image, a background text, a background video, a background gif, and an audible content.

The register content management system and method deploys new and updated register content to a register computing device much faster than traditional systems, for example by not having to develop and send an entire application update. This results in a more efficient computing system, and a faster overall process.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A register content management system for generating and sending updated register content, the register content management system comprising:
   a register content host computing system hosting a content application programming interface (API) exposed to a plurality of point-of-sale registers associated with a retail location, the content application programming interface configured to receive information identifying a retail location point-of-sale register from among the plurality of point-of-sale registers and send updated register content for the retail location register;
   a register content management module executing on the register content host computing system, the register content management module configured to, when executed by a programmable circuit of the register content host computing system:
   receive an identity of the retail location point-of-sale register, the retail location point-of-sale register being positioned at a retail location and managed by the retailer;
   identify a location associated with the retail location point-of-sale register, the location including an identification of a retail location and a position within the retail location;
   identify a time for which the updated register content is requested;
   generate a new register content based at least in part on the identity of the retail location register, the location associated with the retail location point-of-sale register, and the time for which the updated register content is requested,
   wherein the new register content includes:
       background content, including at least one of a background image, a background text, a background video, and a background gif; and
       instructions for display of the background content, including a start time at which to display the background content on the retail location point-of-sale register and a time duration for how long to display the background content on the retail location point-of-sale register; and
   send the new register content to the retail location point-of-sale register, wherein the retail location point-of-sale register displays the background content on a background of a display screen associated with the retail location point-of-sale register while simultaneously displaying sales transaction content as an overlay on the foreground of the display screen associated with the retail location point-of-sale register for the time duration starting at the start time,
   wherein the new register content is generated and sent independently from sending an application update to the retail location point-of-sale register.

2. The register content management system of claim 1, wherein the new register content further is associated with a date for which the new register content is to be displayed.

3. The register content management system of claim 1, wherein the new register content is sent to a plurality of retail location point-of-sale registers associated with a single retail location.

4. The register content management system of claim 1, wherein the retail location point-of-sale register is a self-checkout point-of-sale register.

5. The register content management system of claim 1, wherein sending the new register content further includes sending instructions for display of the new register content.

6. The register content management system of claim 5, wherein the instructions include when to display the new register content during a checkout process on a user interface associated with the retail location point-of-sale register.

7. The register content management system of claim 1, wherein the retail location point-of-sale register is a mobile point-of-sale computing device.

8. A method of providing updated register content to at least one of a plurality of retail location point-of-sale registers, the method comprising:
   receiving an identity of at least one retail location point-of-sale register, the retail location point-of-sale register being positioned at a retail location and managed by the retailer;
   identifying a location associated with the at least one retail location point-of-sale register, the location including an identification of a retail location and a position within the retail location;

identifying a time for which the updated register content is requested;

generating a new register content based at least in part on the identity of the at least one retail location point-of-sale register, the location associated with the at least one retail location point-of-sale register, and the time for which the updated register content is requested, wherein the new register content includes:

- background content, including at least one of a background image, a background text, a background video, and a background gif; and
- a start time at which to display the background content on the retail location point-of-sale register and a time duration for how long to display the background content on the retail location point-of-sale register; and sending the new register content to the retail location point-of-sale register, wherein the retail location point-of-sale register displays the background content on a background of a display screen associated with the retail location point-of-sale register while simultaneously displaying sales transaction content as an overlay on the foreground of the display screen associated with the retail location point-of-sale register for the time duration starting at the start time, wherein generating and sending the new register content occurs independently from sending an application update to the at least one retail location point-of-sale register.

9. The method of claim 8, wherein sending the new register content includes sending a start date for when the new register content is to be displayed.

10. The method of claim 8, wherein sending the new register content includes sending to the at least one of the plurality of retail location point-of-sale registers associated with a single retail location.

11. The method of claim 8, wherein the at least one retail location point-of-sale register is a self-checkout register.

12. The method of claim 8, wherein sending the new register content includes sending instructions for display of the new register content.

13. The method of claim 8, wherein the at least one retail location point-of-sale register is a mobile point-of-sale computing device.

14. A retail location point-of-sale register comprising:

a computing system comprising at least one processor communicatively connected to a memory, the memory storing computer-executable instructions comprising a software tool which, when executed causes the retail location point-of-sale register to:

request, via an application programming interface (API), updated register content, the request including:

- an identity of the retail location point-of-sale register, the retail location point-of-sale register being positioned at a retail location and managed by the retailer;
- a location associated with the retail location point-of-sale register, the location including an identification of a retail location and a position within the retail location; and
- a time for which the updated register content is requested;

receive, from a register content management system, a new register content based at least in part on the identity of the retail location point-of-sale register, the location associated with the retail location point-of-sale register, and the time for which the updated register content is requested, wherein the new register content includes:

- background content, including at least one of a background image, a background text, a background video, and a background gif; and
- a start time at which to display the background content on the retail location point-of-sale register and a time duration for how long to display the background content on the retail location point-of-sale register;

display the background content of the new register content on a background of a display screen associated with the retail location point-of-sale register while simultaneously displaying sales transaction content as an overlay on the foreground of the display screen associated with the retail location point-of-sale register for the time duration starting at the start time, wherein receiving the new register content occurs independently from receiving an application update for the retail location point-of-sale register.

15. The retail location point-of-sale register of claim 14, wherein the predetermined period of time includes a start date and an end date.

16. The retail location point-of-sale register of claim 14, further comprises receiving instructions including when to display the new register content during a checkout process on the user interface associated with the retail location point-of-sale register.

17. The retail location point-of-sale register of claim 16, wherein receiving instructions further comprises instructions for when to display on the user interface, the at least one the background image, the background text, the background video, the background gif, and the audible content.

* * * * *